US 7,889,125 B2

(12) United States Patent
Ring et al.

(10) Patent No.: US 7,889,125 B2
(45) Date of Patent: Feb. 15, 2011

(54) ADJUSTING PROCESSOR CLOCK INFORMATION USING A CLOCK DRIFT ESTIMATE

(75) Inventors: Jeffrey R. Ring, Palm Harbor, FL (US);
Craig P. Allen, Clearwater, FL (US);
Scott Snyder, Mahtomedi, MN (US)

(73) Assignee: Honeywell International Inc.,
Morristown, NJ (US)

( * ) Notice: Subject to any disclaimer, the term of this patent is extended or adjusted under 35 U.S.C. 154(b) by 719 days.

(21) Appl. No.: 11/080,345

(22) Filed: Mar. 15, 2005

(65) Prior Publication Data

US 2006/0208941 A1   Sep. 21, 2006

(51) Int. Cl.
*G01S 19/38* (2010.01)

(52) U.S. Cl. ................................. 342/357.21

(58) Field of Classification Search ..................
342/357.01–357.17
See application file for complete search history.

(56) References Cited

U.S. PATENT DOCUMENTS

| | | | | |
|---|---|---|---|---|
| 4,754,280 A * | 6/1988 | Brown et al. | ........... | 342/357.11 |
| 5,319,374 A | 6/1994 | Desai et al. | | |
| 5,615,236 A * | 3/1997 | Turney | ........................ | 375/365 |
| 5,828,336 A * | 10/1998 | Yunck et al. | ........... | 342/357.02 |
| 5,893,044 A * | 4/1999 | King et al. | .................. | 701/214 |
| 5,959,576 A * | 9/1999 | Ring | ...................... | 342/357.11 |
| 6,134,484 A * | 10/2000 | Geier et al. | .................... | 701/13 |
| 6,167,347 A * | 12/2000 | Lin | ............................ | 701/214 |
| 6,169,957 B1 * | 1/2001 | Arethens | .................... | 701/213 |
| 6,278,404 B1 * | 8/2001 | Niles | ......................... | 342/359 |
| 6,415,223 B1 * | 7/2002 | Lin et al. | .................... | 701/208 |
| 6,480,789 B2 * | 11/2002 | Lin | ............................ | 701/301 |
| 6,522,265 B1 * | 2/2003 | Hillman et al. | ............. | 340/988 |
| 6,598,009 B2 * | 7/2003 | Yang | .......................... | 702/152 |
| 6,621,453 B2 * | 9/2003 | Ring | ..................... | 342/357.11 |
| 6,658,354 B2 * | 12/2003 | Lin | ............................. | 701/214 |
| 6,714,160 B2 * | 3/2004 | McBurney | ............. | 342/357.15 |
| 6,944,540 B2 * | 9/2005 | King et al. | .................. | 701/213 |
| 6,975,266 B2 * | 12/2005 | Abraham et al. | ....... | 342/357.02 |
| 7,069,021 B2 * | 6/2006 | Lehtinen | .................. | 455/456.1 |
| 7,248,964 B2 * | 7/2007 | Bye | .......................... | 701/200 |
| 2001/0020216 A1 * | 9/2001 | Lin | ............................ | 701/216 |
| 2002/0116126 A1 * | 8/2002 | Lin | ............................ | 701/214 |
| 2002/0128775 A1 * | 9/2002 | Brodie et al. | ............... | 701/216 |

(Continued)

FOREIGN PATENT DOCUMENTS

EP    1130415 A2    9/2001

(Continued)

*Primary Examiner*—Thomas H Tarcza
*Assistant Examiner*—Nga X Nguyen
(74) *Attorney, Agent, or Firm*—Fogg & Powers LLC

(57) ABSTRACT

A navigation system comprises a global positioning satellite receiver to receive at least one global positioning satellite signal and to output global positioning satellite information. The navigation system further comprises a programmable processor, communicatively coupled to the global positioning satellite receiver, to execute software. The navigation system further comprises a clock, communicatively to the programmable processor, to output processor clock information. The software estimates an amount of drift in the processor clock information using the GPS information and adjusts the processor clock information for the amount of drift in order to generate adjusted processor clock information. The software generates a navigation solution as a function of at least the global positioning satellite information and the adjusted processor clock information.

22 Claims, 3 Drawing Sheets

U.S. PATENT DOCUMENTS

| | | | |
|---|---|---|---|
| 2002/0158796 A1* | 10/2002 | Humphrey et al. | 342/357.14 |
| 2003/0132878 A1* | 7/2003 | Devereux et al. | 342/357.06 |
| 2003/0149528 A1* | 8/2003 | Lin | 701/214 |
| 2003/0158665 A1* | 8/2003 | McCall et al. | 701/220 |
| 2003/0176970 A1* | 9/2003 | Lin | 701/214 |
| 2003/0187575 A1 | 10/2003 | King et al. | |
| 2005/0125141 A1* | 6/2005 | Bye | 701/200 |
| 2005/0146462 A1* | 7/2005 | Abraham et al. | 342/357.02 |
| 2005/0156782 A1* | 7/2005 | Whelan et al. | 342/357.16 |
| 2005/0234644 A1* | 10/2005 | Lin | 701/214 |
| 2005/0275726 A1* | 12/2005 | Abraham et al. | 348/207.99 |

FOREIGN PATENT DOCUMENTS

EP          1262789  A2          12/2002

* cited by examiner

US 7,889,125 B2

ADJUSTING PROCESSOR CLOCK INFORMATION USING A CLOCK DRIFT ESTIMATE

TECHNICAL FIELD

The following description relates to navigation systems in general and to navigation systems that employ Global Positioning System (GPS) technology in particular.

BACKGROUND

In one type of navigation system, the navigation system generates a navigation solution (for example, an estimate of position and/or velocity) based on information that is a function of time. In one example of such a navigation system, a programmable processor is programmed to generate a position and velocity estimate using an integration operation that is performed once every second. The time between successive integration operations is also referred to here as the "step size" of the integration and is used by one or more of the calculations that are performed during each integration operation. In one implementation of such a system, the step size is determined for each integration operation using the clock signal used by the programmable processor (also referred to here as the "processor clock signal"). In some applications, however, the integration operation performed by the system is especially sensitive to errors in the step size and, in such applications, using the processor clock signal to determine the step size for each integration operation may not result in a sufficiently accurate navigation solution due to clock drift in the processor clock information.

SUMMARY

In one embodiment, a navigation system comprises a global positioning satellite receiver to receive at least one global positioning satellite signal and to output global positioning satellite information. The navigation system further comprises a programmable processor, communicatively coupled to the global positioning satellite receiver, to execute software. The navigation system further comprises a clock, communicatively to the programmable processor, to output processor clock information. The software estimates an amount of drift in the processor clock information using the GPS information and adjusts the processor clock information for the amount of drift in order to generate adjusted processor clock information. The software generates a navigation solution as a function of at least the global positioning satellite information and the adjusted processor clock information.

In another embodiment, software embodied on a storage medium comprises a plurality of program instructions that are operable to cause a processor to estimate an amount of drift in processor clock information based on global positioning satellite information, adjust the processor clock information for the amount of drift in order to generate adjusted processor clock information, and generate a navigation solution using the adjusted processor clock information.

In another embodiment, a method comprises estimating an amount of drift in processor clock information based on global positioning satellite information, adjusting the processor clock information for the amount of drift in order to generate adjusted processor clock information, and generating a navigation solution using the adjusted processor clock information.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
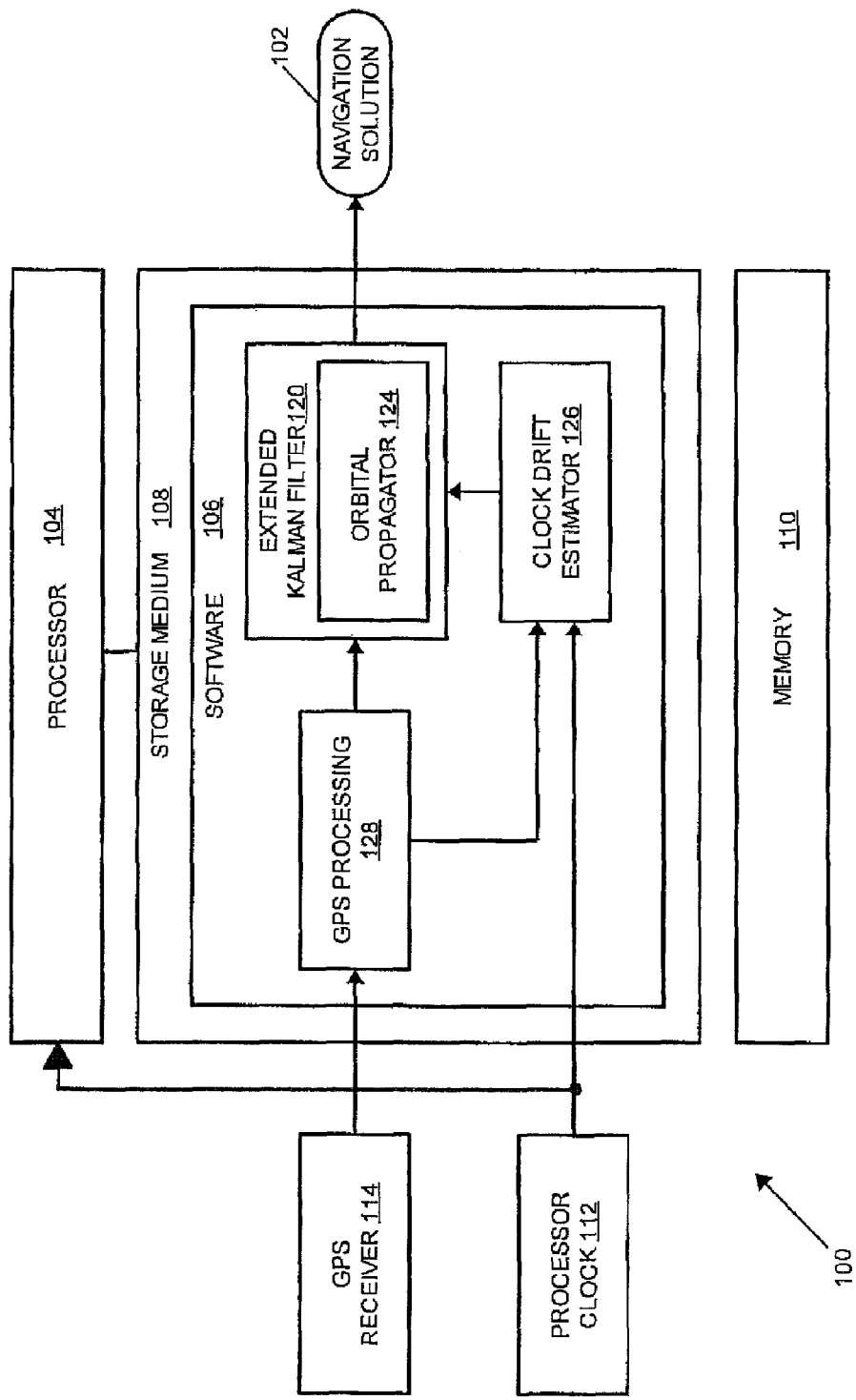
FIG. 1 is a block diagram of one embodiment of a navigation system.

FIG. 1 is a block diagram of one embodiment of a navigation system 100. The navigation system 100 is suitable for use in implementing the systems, devices, methods, and/or techniques described here. In the particular embodiment shown in FIG. 1, the navigation system 100 is used on, in, or with a satellite (or similar vehicle) to generate a navigation solution 102 for use in controlling the operation of the satellite. In one implementation, the navigation solution 102 comprises an estimate of position, velocity, and acceleration of the system 100 or a vehicle associated with the system 100. In other embodiments, the navigation system 100 is implemented in other ways and/or for other applications.

In the particular embodiment shown in FIG. 1, the navigation system 100 comprises at least one programmable processor 104. The programmable processor 104 executes software 106 that causes the programmable processor 104 to carry out at least a portion of the functionality described here as being performed by the navigation system 100. In the embodiment shown in FIG. 1, the software 106 comprises program instructions that are stored (or otherwise embodied) in or on a storage medium 108 from which the programmable processor 104 reads at least a portion of the program instructions for execution. The navigation system 100 further includes memory 110 for storing program instructions and/or associated data structures during execution of the software 106. The memory 110 comprises, for example, any suitable form of volatile memory and/or non-volatile memory now known or later developed.

A clock 112 (also referred to here as the "processor clock" 112) outputs a clock signal (also referred to here as the "processor clock signal") that is used by the processor 104 as a clock signal. In the embodiment shown in FIG. 1, the software 106 executing on the processor 104 receives or derives processor clock information from the processor clock signal output by the processor clock 112 that is used in at least a portion of the processing performed by the software 106.

The navigation system 100 further comprises a GPS receiver 114. The GPS receiver 114 receives a GPS radio frequency (RF) signal from one or more GPS satellites and outputs GPS information 116 derived from the received GPS RF signals. In one implementation of such an embodiment, the GPS information 116 includes one or more GPS observables for each GPS satellite from which the GPS receiver 114 is able to receive a GPS RF signal at that moment. In one implementation of such an embodiment, the GPS receiver 114 makes use of differential GPS techniques to generate such estimates; in another implementation, the GPS receiver 114 does not use differential GPS techniques to generate such estimates. In other embodiments, the GPS receiver 114 outputs other GPS information 116 derived from any GPS RF signals received by the GPS receiver 114 (for example, where the GPS receiver 114 and the software 106 are integrated using "ultra tight" or "deep" integration).

In the embodiment shown in FIG. 1, the software 106 executed by the processor 104 comprises as an extended Kalman filter 120 that is used to generate the navigation solution 102 based on at least a portion of the GPS information 116 (when available) and time information. In such an embodiment, the extended Kalman filter 120, for example, includes an orbital propagator 124 that outputs an initial navigation solution estimate (for example, an initial estimate of position, velocity, and acceleration of a vehicle associated with the system 100) based on an initial known starting state (for example, derived from GPS information 116) and the time information input to the extended Kalman filter 120. The GPS information 116, when available, is used to "correct" the initial navigation solution estimate output by the orbital propagator 124. In one implementation of such an embodiment, the extended Kalman filter 120 is implemented using a fourth-order Runga-Kutta integrator.

In such an implementation, the Runga-Kutta integrator performs an integration operation every second (nominally). The time between successive integration operations is also referred to here as the "step size" of the integration and is used by one or more of the calculations that are performed during each integration operation. In such an implementation, the step size is determined for each integration operation performed by the Runga-Kutta integrator using the time information received by the Kalman filter 120. However, each integration operation is typically especially sensitive to errors in the step size (for example, due to any drift in the underlying time information from which the step size is determined).

The software 106 further comprises a clock drift estimator 126. The clock drift estimator 126 uses processor clock information received or derived from the processor clock signal output by the processor clock 112. When the GPS information 116 is available, the clock drift estimator 126 estimates the amount of clock drift for the processor clock information based on time information (also referred to here as "GPS time information") included in or derived from the GPS information 116 output by the GPS receiver 114. The estimate of the amount of clock drift for the processor clock information is also referred to here as the "clock drift estimate." In the embodiment shown in FIG. 1, the software 106 comprises GPS processing software 128 that generates, based on the GPS information 116 output by the GPS receiver 114, the GPS time information used by the clock drift estimator 126. In other embodiments, the GPS receiver 114 itself outputs the GPS time information used by the clock drift estimator 126.

The clock drift estimator 126 uses the clock drift estimate to adjust the processor clock information in order to compensate for the estimated clock drift. The adjusted processor clock information is used as the time information that input to the extended Kalman filter 120 for the processing performed by the extended Kalman filter 120. When the GPS information 116 is not available, in one implementation, the clock drift estimator 126 uses the last clock drift estimate generated by the clock drift estimator 126 to adjust the processor clock information received or derived from the processor clock signal output by the processor clock 112.

In operation, when the GPS receiver 114 is able to receive one or more GPS RF signals from one or more respective GPS satellites, the GPS receiver 114 outputs GPS information 116. The GPS information 116 is received by the extended Kalman filter 120 and the GPS processing software 128. The GPS processing software 128 derives GPS time information from the GPS information 116 output by the GPS receiver 114. The GPS time information output by the GPS processing software 128 is used by the clock drift estimator 126 to generate a clock drift estimate for the processor clock information received or derived from the processor clock signal output by the processor clock 112 and to adjust the processor clock information in order to compensate for the estimated clock drift. The adjusted processor clock information is then output by the clock drift estimator 126 to the extended Kalman filter 120 for use by the orbital propagator 124 in generating the initial navigation solution estimate. The extended Kalman filter 120 also uses the GPS information output by the GPS receiver 114 to correct the initial navigation solution estimate output by the orbital propagator 124. The corrected navigation solution estimate is output as the navigation solution 102.

When the GPS receiver 114 is not able to receive at least one GPS RF signal from a GPS satellite, the GPS receiver 114 is unable to output GPS information 116. In such a situation, the clock drift estimator 126 uses the last clock drift estimate to adjust processor clock information received or derived from the processor clock signal output by the processor clock 112. The adjusted processor clock information is then output by the clock drift estimator 126 to the extended Kalman filter 120 for use by the orbital propagator 124 in calculating the initial navigation solution estimate. The extended Kalman filter 120 also uses the GPS information output by the GPS receiver 114 to correct the initial navigation solution estimate output by the orbital propagator 124. The corrected navigation solution estimate is output as the navigation solution 102.

In this way, the accuracy of the time information used in the navigation-solution processing performed by the software 106 (for example, by the extended Kalman filter 120) is improved, which in improves the accuracy of the navigation solution 102 generated by the system 100. This improvement is especially meaningful in those applications where the navigation-solution processing performed by the software 106 is especially sensitive to errors in the time information used in such processing.

Figure 2:
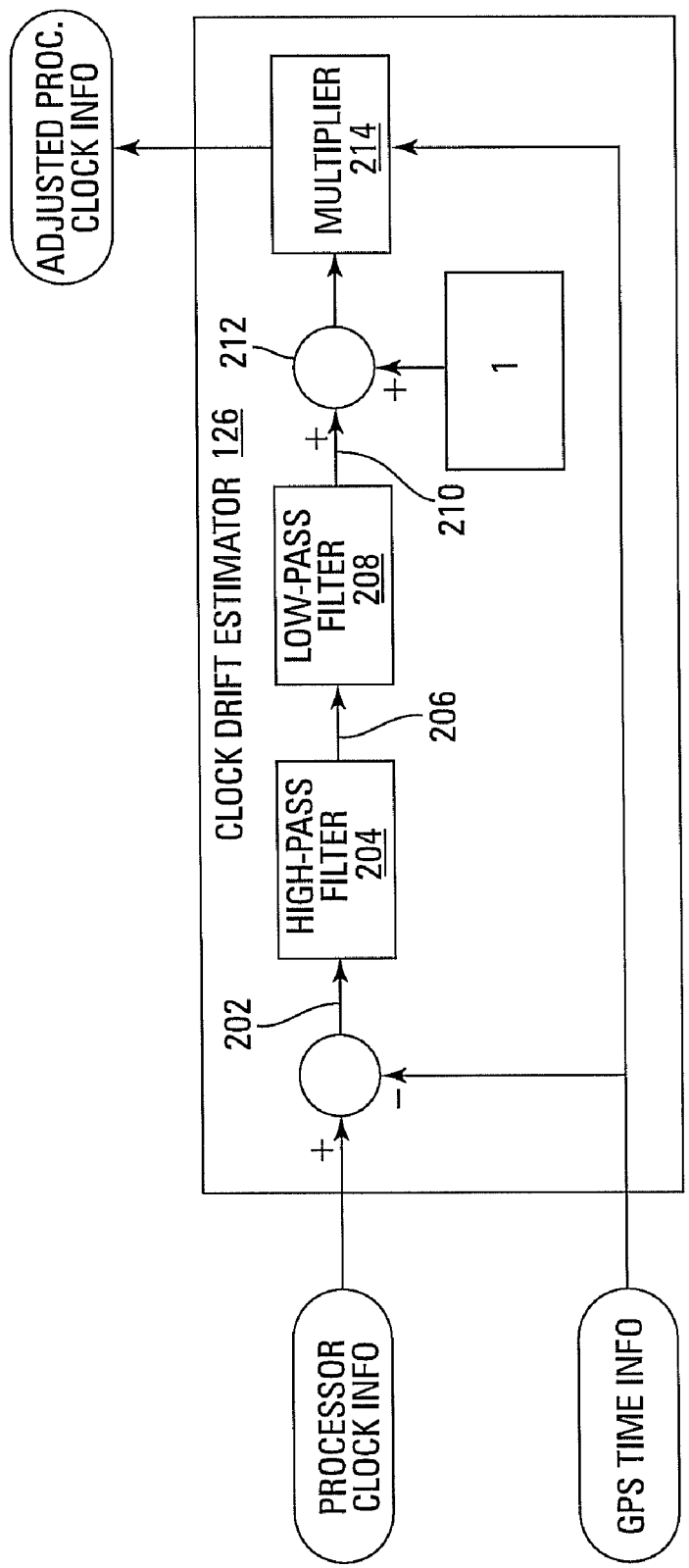
FIG. 2 is a block diagram of one embodiment of a clock drift estimator suitable for use in the navigation system of FIG. 1.

FIG. 2 is a block diagram of one embodiment of a clock drift estimator 126 suitable for use in the navigation system 100 of FIG. 1. The embodiment of the clock drift estimator 126 is implemented in the software 106 executed by the processor 104. In other embodiments, the clock drift estimator 126 is implemented in other ways.

The clock drift estimator 126, in the embodiment shown in FIG. 2, receives as inputs the processor clock information received or derived from the processor clock signal output by the processor clock 112 and the GPS time information generated by the GPS processing software 128. The clock drift estimator 126 subtracts the processor clock information from the GPS time information, which generates error information 202. The clock drift estimator 126 comprises a high-pass filter 204 that high-pass filters the error information 202 and outputs a high-pass filtered information 206 that is indicative of the rate of change of the error information 202 (that is, the first derivative of the error information 202). In one implementation of such an embodiment, the high-pass filter 204 comprises a first-order high-pass filter having a cutoff frequency 0.0628 Hz.

The clock drift estimator 202 further comprises a low-pass filter 208 that low-pass filters the high-pass filtered information 206 in order to remove noise from the high-pass filtered information 206. The low-pass filter 208 outputs filtered clock drift estimate information 210. In one implementation of such an embodiment, the low-pass filter 208 comprises a first-order low-pass filter having a cutoff frequency 0.0628 Hz. The clock drift estimator 202 further comprises an adder 212 that adds the filtered clock drift estimate information 210 to one. The clock drift estimator 202 further comprises a multiplier 214 that multiplies the processor clock information by the output of the adder 212. The output of the multiplier 214 is output as the adjusted processor clock information that is used by the extended Kalman filter 120 for the processing described above in connection with FIG. 1.

Figure 3:
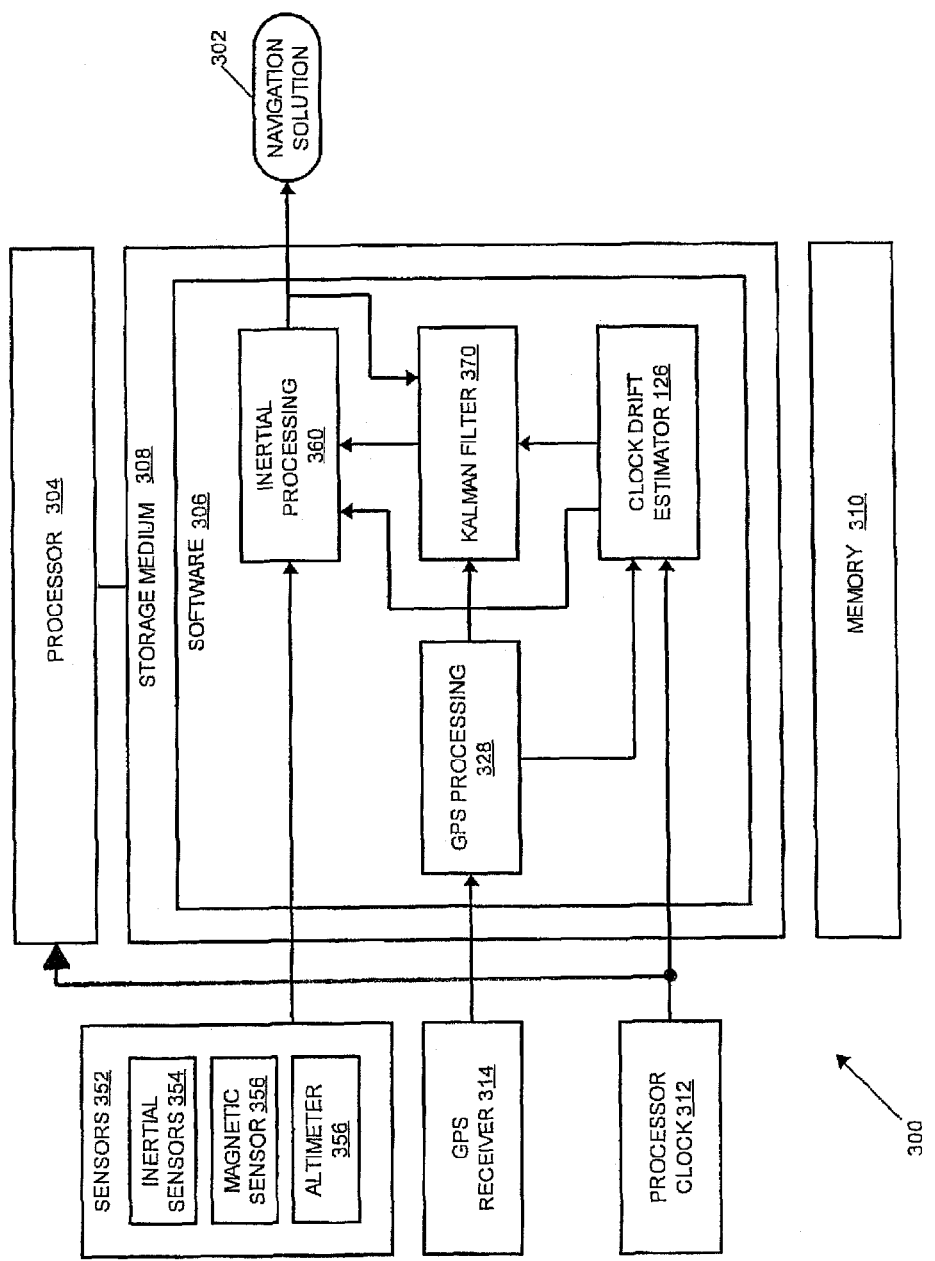
FIG. 3 is a block diagram of one embodiment of a navigation system.

The processor-clock adjustment techniques described here can be used in other embodiments of a navigation system. One such alternative embodiment is shown in FIG. 3. FIG. 3 is a block diagram of one embodiment of a navigation system 300. The navigation system 300 is suitable for use with the clock drift estimator 126 of FIG. 2.

In the particular embodiment shown in FIG. 3, the navigation system 300 comprises at least one programmable processor 304. The programmable processor 304 executes software 306 that causes the programmable processor 304 to carry out at least a portion of the functionality described here as being performed by the navigation system 300. In the embodiment shown in FIG. 3, the software 306 comprises program instructions that are stored (or otherwise embodied) in or on a storage medium 308 from which the programmable processor 304 reads at least a portion of the program instructions for execution. The navigation system 300 further includes memory 310 for storing program instructions and/or associated data structures during execution of the software 306. The memory 310 comprises, for example, any suitable form of volatile memory and/or non-volatile memory now known or later developed.

A processor clock 312 outputs a processor clock signal that is used by the processor 304 as a clock signal. In the embodiment shown in FIG. 3, the software 306 executing on the processor 304 receives or derives processor clock information from the processor clock signal output by the processor clock 312 that is used in at least a portion of the processing performed by the software 306.

The navigation system 300 further comprises a GPS receiver 314. The GPS receiver 314 receives a GPS RF signal from one or more GPS satellites and outputs GPS information 316 derived from the received GPS RF signals. In one implementation of such an embodiment, the GPS information 316 includes one or more GPS observables for each GPS satellite from which the GPS receiver 314 is able to receive a GPS RF signal at that moment. In one implementation of such an embodiment, the GPS receiver 314 makes use of differential GPS techniques to generate such estimates; in another implementation, the GPS receiver 314 does not use differential GPS techniques to generate such estimates. In other embodiments, the GPS receiver 314 outputs other GPS information 316 derived from any GPS RF signals received by the GPS receiver 314 (for example, where the GPS receiver 114 and the software 306 are integrated using "ultra tight" or "deep" integration).

In the embodiment shown in FIG. 3, the navigation system 300 further comprises one or more sensors 352. The sensors 352 generate information (for example, in the form of one or more analog signals or one or more digital data streams) that are indicative of a position and/or movement of the navigation system 300. The sensors 352 are communicatively coupled to the programmable processor 304 via appropriate interface componentry. In the embodiment shown in FIG. 3, the sensors 352 include one or more inertial sensors 354, one or more magnetic sensors 356, and one or more altimeters 358. In the embodiment shown in FIG. 3, the software 306 executed by the processor 304 comprises as an inertial processing software 360 that receives information (also referred to here as a "sensor information") from one or more of the sensors 352 and uses the received sensor information to generate a first navigation solution 362. In the embodiment shown in FIG. 3, the inertial processing software 360 uses the processor clock information output by the processor clock 312 in at least a portion of the processing performed thereby.

In one implementation of such an embodiment, the inertial sensors 354 comprises three accelerometers that are oriented around three mutually orthogonal axes (for example, the x, y, and z axes). In such an implementation, the inertial sensors 354 further comprise three gyroscopes that are oriented around three mutually orthogonal axes (for example, the pitch, yaw, and roll axes). The inertial processing software 360, in such an implementation, processes the outputs of the accelerometers and the gyroscopes. For example, the three orthogonal outputs of the accelerometers are vectorily summed by the inertial processing unit 360 to obtain an acceleration vector for the navigation system 300. The inertial processing software 360 integrates the acceleration vector to obtain a velocity vector for the navigation system 300 and then integrates the velocity vector to obtain a position change vector for the navigation system 300. The three orthogonal outputs of the gyroscopes are vectorily summed by the inertial processing software 360 to obtain a rotational velocity vector for the navigation system 300. The inertial processing software 360 integrates the rotational velocity vector to obtain the attitude change vector of the navigation system 300. The position change vector and the attitude change vector are used to generate the navigation solution 362. The inertial processing software 360, in the embodiment shown in FIG. 3, also uses time information in the processing performed by the inertial processing software 360. In other embodiments and implementations, the sensors 352 and the inertial processing software 360 are implemented in other ways.

In the embodiment shown in FIG. 3, the software 306 executed by the processor 304 comprises a Kalman filter 370. The Kalman filter 370 receives the navigation solution 362 output by the inertial processing unit 360 (for example, a position, velocity, and attitude estimate), sensors information from one or more of the sensors 352 and GPS information from the GPS receiver 314. The Kalman filter 370 generates, based on such inputs, corrective feedback for use by the inertial processing software 360 in controlling navigation error growth. In the embodiment shown in FIG. 3, the Kalman filter 370 uses time information in at least a portion of the processing performed thereby.

The software 306 further comprises a clock drift estimator 126 of the type described above in connection with FIGS. 1 and 2. The clock drift estimator 126 uses processor clock information received or derived from the processor clock signal output by the processor clock 312. When the GPS information 316 is available, the clock drift estimator 126 estimates the amount of clock drift for the processor clock information based on GPS time information included in or derived from the GPS information 316 output by the GPS receiver 314. In the embodiment shown in FIG. 3, the software 306 comprises GPS processing software 328 that generates, based on the GPS information 316 output by the GPS receiver 314, the GPS time information used by the clock drift estimator 126. In other embodiments, the GPS receiver 314 itself outputs the GPS time information used by the clock drift estimator 126.

The clock drift estimator 126 uses the clock drift estimate to adjust the processor clock information in order to compensate for the estimated clock drift. The adjusted processor clock information is used as the time information for processing performed by the inertial processing unit 360 and the Kalman filter 370. When the GPS information 316 is not available, in one implementation, the clock drift estimator 126 uses the last clock drift estimate generated by the clock drift estimator 126 to adjust the processor clock information.

In operation, when the GPS receiver 314 is able to receive one or more GPS RF signals from one or more respective GPS satellites, the GPS receiver 314 outputs GPS information 316. The GPS information 316 is received by the GPS processing software 328 and the Kalman filter 370. The GPS processing software 328 derives GPS time information from the GPS information 316 output by the GPS receiver 314. The GPS time information output by the GPS processing software 328 is used by the clock drift estimator 126 to calculate a clock drift estimate for the processor clock information received or derived from the processor clock signal output by the processor clock 312 and to adjust the processor clock information in order to compensate for the estimated clock drift. The adjusted processor clock information is then output by the clock drift estimator 126 to the inertial processing software 360 and the Kalman filter 370. The inertial processing software 360 uses the sensor information output by at least one of the sensors 352, the adjusted processor clock information, and the corrective feedback output by the Kalman filter 370 to generate the navigation solution 302. The Kalman filter 370 uses the navigation solution 302, the sensor information, the GPS information 316, and the adjusted processor clock information to generate the corrective feedback that is fed back to the inertial processing software 360.

When the GPS receiver 314 is not able to receive at least one GPS RF signal from a GPS satellite, the GPS receiver 314 is unable to output GPS information 316. In such a situation, the clock drift estimator 126 uses the last clock drift estimate to adjust the processor clock information received or derived from the processor clock signal output by the processor clock 112. The adjusted processor clock information is output by the clock drift estimator 126 to the inertial processing software 360 and the Kalman filter 370 for use in generating the navigation solution 302 and the corrective feedback, respectively.

In this way, the accuracy of the time information used in the navigation-solution processing performed by the software 306 (for example, by the inertial processing software 360 and the Kalman filter 370) is improved, which improves the accuracy of the navigation solution 302 generated by the system 300. This improvement is especially meaningful in those applications where the navigation-solution processing performed by the software 306 is especially sensitive to errors in the time information used in such processing.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A navigation system comprising:
a global positioning satellite receiver to receive at least one global positioning satellite signal and to output global positioning satellite information;
a programmable processor, communicatively coupled to the global positioning satellite receiver, to execute software; and
a clock, communicatively coupled to the programmable processor, to output a processor clock signal that is used to clock the programmable processor;
wherein the software estimates an amount of drift in the processor clock signal using the GPS information and generates adjusted processor clock information using the amount of drift;
wherein the software generates a navigation solution as a function of at least the global positioning satellite information and the adjusted processor clock information.

2. The navigation system of claim 1, wherein the software comprises an extended Kalman filter to generate the navigation solution as a function of the global positioning information and the adjusted processor clock information.

3. The navigation system of claim 2, wherein the extended Kalman filter comprises an orbital propagator.

4. The navigation system of claim 1, further comprising at least one sensor that generates sensor information, wherein at least a portion of the sensor information is processed by the software.

5. The navigation system of claim 4, wherein the sensor comprises an inertial sensor that generates inertial sensor information, wherein the software comprises an inertial processing software that generates the navigation solution as a function of at least a portion of the inertial sensor information.

6. The navigation system of claim 5, wherein the inertial processing software generates the navigation solution as a function of the adjusted processor clock information.

7. The navigation system of claim 5, wherein the software comprises a Kalman filter that generates corrective feedback as a function of at least the global position satellite information, wherein the inertial processing unit generates the navigation solution as a function of the corrective feedback.

8. The navigation system of claim 7, wherein the Kalman filter generates the corrective feedback as a function of the adjusted processor clock information.

9. The navigation system of claim 1, wherein the navigation system is incorporated in a vehicle.

10. The navigation system of claim 9, wherein the vehicle comprises an aerospace vehicle.

11. The navigation system of claim 1, wherein:
the software estimates the amount of drift in the processor clock information by high-pass filtering the processor clock information to generate high-pass filtered processor clock information and low-pass filtering the high-pass filtered processor clock information to generate low-pass filtered processor clock information; and the software adjusts the processor clock information for the amount of drift in order to generate the adjusted processor clock information by adding the low-pass filtered processor clock information to one to output a sum information and multiplying the sum information by the processor clock information in order to generate the adjusted processor clock information.

12. Software embodied on a storage medium comprising a plurality of program instructions operable to cause a processor to:

estimate an amount of drift in a processor clock signal based on global positioning satellite information, the processor clock signal used to clock the processor;

generate adjusted processor clock information using the amount of drift in the processor clock signal; and generate a navigation solution using the adjusted processor clock information.

13. The software of claim 12, wherein the software comprises program instructions operable to cause the processor to:

estimate the amount of drift in the processor clock information by high-pass filtering the processor clock information to generate high-pass filtered processor clock information and low-pass filtering the high-pass filtered processor clock information to generate low-pass filtered processor clock information; and generate the adjusted processor clock information by adding the low-pass filtered processor clock information to one to output a sum information and multiplying the sum information by the processor clock information in order to generate the adjusted processor clock information.

14. The software of claim 12, wherein the software comprises an extended Kalman filter to generate the navigation solution as a function of the global positioning information and the adjusted processor clock information.

15. The software of claim 14, wherein the extended Kalman filter comprises an orbital propagator.

16. The software of claim 12, wherein the software comprises program instructions operable to cause the processor to receive sensor information and process at least a portion of the sensor information.

17. The software of claim 16, wherein the sensor information comprises inertial sensor information and wherein the software comprises inertial processing software that generates the navigation solution as a function of at least a portion of the inertial sensor information.

18. The software of claim 17, wherein the inertial processing software generates the navigation solution as a function of the adjusted processor clock information.

19. The software of claim 17, wherein the software comprises a Kalman filter that generates corrective feedback as a function of at least the global position satellite information, wherein the inertial processing unit generates the navigation solution as a function of the corrective feedback.

20. The software of claim 19, wherein the Kalman filter generates the corrective feedback as a function of the adjusted processor clock information.

21. A method comprising:

estimating an amount of drift in a processor clock signal based on global positioning satellite information, the processor clock signal used to clock a processor;

adjusting the processor clock signal for the amount of drift in order to generate adjusted processor clock information; and generating a navigation solution using the adjusted processor clock information for controlling a vehicle.

22. An apparatus comprising:

means for estimating an amount of drift in a processor clock signal based on global positioning satellite information, the processor clock signal used to clock a processor;

means for adjusting the processor clock signal for the amount of drift in order to generate adjusted processor clock information; and means for generating a navigation solution using the adjusted processor clock information.

* * * * *